United States Patent [19]

Kampichler

[11] 4,455,868

[45] Jun. 26, 1984

[54] METHOD FOR MOUNTING AT LEAST ONE SINGLE-CYLINDER PLUG-IN FUEL INJECTION PUMP ON A DIESEL INTERNAL COMBUSTION ENGINE

[75] Inventor: Günter Kampichler, Mühlacker, Fed. Rep. of Germany

[73] Assignee: Robert Bosch GmbH, Stuttgart, Fed. Rep. of Germany

[21] Appl. No.: 417,738

[22] Filed: Sep. 13, 1982

[30] Foreign Application Priority Data

Mar. 25, 1982 [DE] Fed. Rep. of Germany ....... 3210988

[51] Int. Cl.3 ............................................ C01M 15/00

[52] U.S. Cl. .................................. 73/119 A; 123/343

[58] Field of Search ................ 73/1 R, 119 A, 118 R, 73/168; 123/343, 495, 509

[56] References Cited

U.S. PATENT DOCUMENTS

| | | | |
|---|---|---|---|
| 2,975,776 | 3/1961 | Nicolls | 123/495 |
| 3,702,277 | 11/1972 | Staudt | 123/495 X |
| 3,946,590 | 3/1976 | Bechstein et al. | 73/1 R |
| 4,167,926 | 9/1979 | Leblanc | 73/119 A X |
| 4,344,323 | 8/1982 | Richardson | 73/119 A |
| 4,385,867 | 5/1983 | Straubel | 123/509 X |

FOREIGN PATENT DOCUMENTS

| | | |
|---|---|---|
| 269560 | 3/1969 | Austria . |
| 1050604 | 2/1959 | Fed. Rep. of Germany . |

*Primary Examiner*—Jerry W. Myracle
*Assistant Examiner*—E. Harding
*Attorney, Agent, or Firm*—Edwin E. Greigg

[57] ABSTRACT

A method in which a plug-in pump, controlled by oblique edges, is inserted with the aid of an adjusting device into a pump fitting of an internal combustion engine and which without subsequent correction of the supply quantity guarantees an identical supply quantity for all the plug-in pumps of one engine. With a supply quantity adjusting member held firmly in a test position, the plug-in pump is inserted into the test pedestal and rotated until such time as the supply quantity corresponds to the set-point supply quantity, this rotational position marked by a slash mark on the flange of the plug-in pump. With a governor rod, which is part of the engine, locked in the basic test position, a second slash mark is subsequently made on the pump fitting by means of a dummy pump. Once the dummy pump has been removed, the plug-in pump is secured in the pump fitting of the engine with the slash marks in alignment. The governor rod of the engine is embodied in one piece with mating elements, disposed at the spacing of the cylinders, for the coupling elements of the plug-in pumps and is provided with a governor rod locking device.

14 Claims, 10 Drawing Figures

METHOD FOR MOUNTING AT LEAST ONE SINGLE-CYLINDER PLUG-IN FUEL INJECTION PUMP ON A DIESEL INTERNAL COMBUSTION ENGINE

BACKGROUND OF THE INVENTION

The invention is based on a method as generally defined hereinafter and relates further to internal combustion engines, injection pumps and apparatus for performing the method according to the invention.

Single-cylinder plug-in fuel injection pumps, called plug-in pumps, are advantageously used whenever the expenditure for a series of distributor injection pump is excessive in the case of engines with a low cylinder output (approximately 2 to 30 KW per cylinder), and whenever the injection pumps are to be mounted as close as possible to the injection nozzle of the associated engine as a result of the use of short pressure lines and the improved injection conditions thereby attainable. Plug-in pumps do not have their own drive mechanism; instead, they are driven by a camshaft which is part of the engine. The regulation of the injection quantity is effected by way of a governor rod which is part of the engine, this rod being located, like the supply quantity adjusting member of the plug-in pump, below the associated fastening flange inside the pump fitting of the engine. Pumps of this type are known, such as those of the Robert Bosch GmbH, Stuttgart, Federal Republic of Germany, and designated PF 1Q . . . and PFR 1K . . . (for instance, see the pamphlet entitled "Injection Equipment for Diesel Engines with Injection Pump Type PF", VDT-UBP 001/6B by Robert Bosch GmbH, Stuttgart); each of these pumps, before being mounted on a particular engine, is adjusted at a test bench, using a test pedestal adapted to a set-point supply quantity which is identical for all pumps of the same series, then inserted in the associated pump fitting of the engine with the aid of an adjusting apparatus and secured there. Since in the known pumps the adjusting apparatus provided with a fixation pin fixes solely the mounted position at the pump fitting, the engine must be precisely adjusted on the test bench once again in terms of the supply quantities of the individual plug-in pumps, which is very expensive. Adjustable coupling parts of the governor rod belonging to the engine have to be coupled to the supply quantity adjusting member of the plug-in pumps and adjusted. If one of the plug-in pumps is replaced, this test procedure must be performed once again.

The above disadvantage also applies to plug-in pumps of the type shown in U.S. Pat. No. 2,975,776, because the adjusting apparatus used there, comprising a positional fixation pin for the securing flange and a pin for the positionally correct mounting of the pinion through a gap in gear teeth in the governor rod belonging to the engine, merely prevents incorrect mounting; a precise setting of supply quantity which will be retained even if the pump is replaced is neither intended nor possible in this apparatus. In order to be able to replace individual pumps or pumping elements in the case of damage without performing a new basic setting for all the injection pumps, a method and an associated injection pump for the method have been proposed by Austrian Pat. No. 269 560 and German Pat. No. 1 050 604. In these patents, pumping elements embodied in the manner of plug-in pumps which have been adjusted on a test pedestal in terms of their supply quantity are combined in a common pump housing and are driven by a governor rod located in the pump housing. With these types of apparatus, although the individual pumping elements can be replaced, the governor rod which is the same for all the pumping elements must still have adjustable mating elements for the coupling elements of the supply quantity adjustment members; the associating adjusting devices are very expensive and laborious, and the overall apparatus is poorly adapted to being mounted on an engine.

The object of the invention is to simplify the method for mounting the plug-in pumps as well as the associated pumps and the internal combustion engine in such a way that not only the method but also the plug-in pumps and the governor elements on the internal combustion engine are all made less expensive.

OBJECT AND SUMMARY OF THE INVENTION

The method according to the apparatus having the method steps disclosed in the novelty portion of the main claim makes it possible for the first time, given a set-point supply quantity guaranteed by the manufacturer of the injection pump, to assure equal supply to all the injection pumps in multiple-cylinder engines, without subsequent readjustment after mounting on the engine. The governor rod which is part of the engine may be embodied as a simple, stamped sheetmetal element having fixed mating elements for the coupling elements of the supply quantity adjusting members of the plug-in pumps, and the internal combustion engine no longer requires a viewing window for readjusting the governor rod. For adjusting the required engine output, again, the engine no longer needs to be put onto the brake, which is very advantageous particularly in the case of an integrated drive mechanism, because in the case of an assembly firmly mounted to the engine crank shaft, for instance, there is no longer any possibility whatsoever of being able to adjust the engine solely in terms of its output.

By means of the characteristics disclosed herein, advantageous further developments of and improvements to the method disclosed are possible. For instance, the slash marks disclosed can be placed on either the plug-in pump, or on the pump fitting of the engine, with very simple tools.

The fixation pin according to FIG. 3 serving as the second half of the adjusting apparatus may be attached to the pump fitting of the engine either by means of the dummy pump acting as a drilling device or by means of a plastic melting adhesive which can be applied by means of a spray gun. Based on a basic test setting which is identical for all engines and injection pumps and which is the median setting of the supply quantity adjusting member, for instance, the established full-load position of the governor rod which is part of the engine, which is adjustable, and is simultaneously selected as the test position for establishing the set-point supply quantity on the test bench. All the tolerances existing in the engine and at the injection pump are thereby substantially prevented from affecting the full-load position, which is the most important in terms of tolerance.

The method for application of the slash marks substantially precludes human error and is thus independent of the skill of the worker applying the slash marks.

An injection pump for performing the method differs from previously available injection pumps only in the machined face receiving the slash mark on the securing flange, and with the novelty portion of the method, which are simple to produce, it is possible with an appropriate matching of tolerances of the individual elements of the pump to eliminate a supplementary adjusting device, for instance an adjusting eccentric on the pumping element, for the adjustment of identical supply quantities; as a result the pump can be manufactured much less expensively. Even a multiple-cylinder engine can be produced much less expensively than before when the method is used, because the self-contained governor rod of the engine does not need to have any adjustable mating elements otherwise required for setting identical supply quantities. The recess possibly provided for engagement by a governor rod blocking device can naturally be accommodated in the governor linkage, coupled to the governor rod, as well. In a single-cylinder engine, the governor rod itself becomes either simpler than was previously the case or at least, it is possible to eliminate or simplify adjustable connecting elements for the associated governor.

The test pedestal to be used in the method according to the invention advantageously guarantees that the mounting of the plug-in pump on the engine can be duplicated at any time and is precisely fixed, while assuring the correct set-point quantity.

The dummy pump embodied herein for performing the method is not required in great numbers; for instance, each engine manufacturer requires only one. The dummy pump can be inexpensively manufactured and as needed may also be embodied by a plug-in pump provided with a supply quantity adjusting member blocked in the basic test position, or with the existence of a locking device all of the plug-in pumps to be mounted can act as dummy-pumps for applying the required slash mark on the engine.

The invention will be better understood and further objects and advantages thereof will become more apparent from the ensuing detailed description of preferred embodiments taken in conjunction with the drawings.

DESCRIPTION OF THE EXEMPLARY EMBODIMENTS

Figure 1:
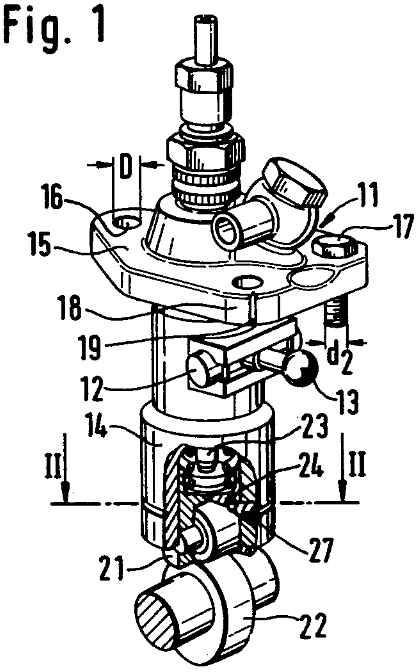
FIG. 1 is a perspective view of a plug-in pump embodied in accordance with the invention.

FIG. 1 shows a single-cylinder, plug-in fuel injection pump 11, henceforth called merely a plug-in pump of the type PFR1K . . . made by Robert Bosch GmbH, Stuttgart, which has a supply quantity adjusting member 12 embodied as a rack having a ball-type head 13 acting as a coupling element, this member 12 being intended for adjusting the supply quantity at a pump piston 23 shown only in part and provided in a known manner with an oblique control edge; the pump housing 14 is equipped with a securing flange 15 attached above the supply quantity adjusting member 12. In the illustrated example, the securing flange 15 includes three passageway bores 16, each bore receiving one securing screw 17. The passageway bores 16 have an inner diameter D which has been greatly enlarged, in contrast to normal passageway bores, as compared with a shaft diameter $d_2$ of the securing screws 17 and thus have the function of elongated holes, enabling rotation of the pump housing 14 in order to adjust the set-point supply quantity in accordance with the invention, as will be described below. The securing flange 15 is also provided with a machined face 18 located at its outer circumference, which receives a slash mark 19 applied in accordance with the method described below.

Figure 2:
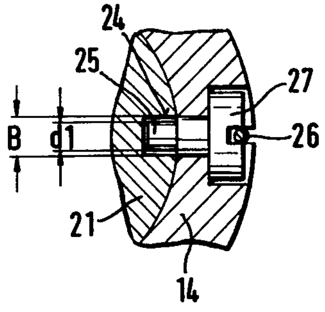
FIG. 2 is a portion of a cross section taken along the line II—II of FIG. 1, shown on an enlarged scale.

The plug-in pump 11 also receives a roller push-rod 21 sliding within its pump housing 14, and the roller push-rod 21 transmits the driving force of a drive cam 22 of the engine onto the pump piston 23. A fastening tang 25 of a fastening bolt 27 held in its installed position by a spring wire 26 engages a longitudinal groove 24 (see FIG. 2 as well) of the roller push-rod 21. In contrast to conventional fastening bolts, the fastening bolt 27 has a substantially smaller diameter $d_1$ at the fastening tang 25 as compared with the width B of the longitudinal groove 24. The dimensional differences $B-d_1$ and $D-d_2$ between the longitudinal groove 24 and the fastening tang 25 as well as between the passageway bores 16 and the securing screws 17 are adapted to one another in such a manner that they enable the rotation of the pump housing 14 required for adjusting the plug-in pump 11 as well as the simultaneous accommodation of the roller push-rod 21 relative to the race of the drive cam 22, while taking into consideration existing tolerances.

Figure 3:
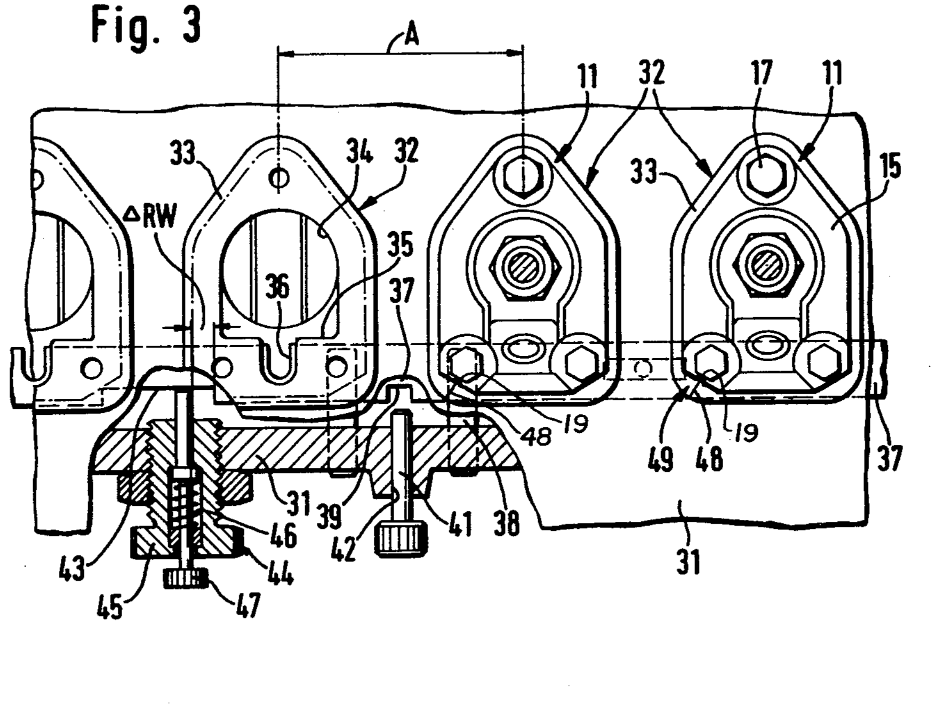
FIG. 3 is a partially cut away plan view on one part of the associated internal combustion engine having two mounted plug-in pumps and two open pump fittings lacking plug-in pumps.

In FIG. 3, 31 indicates a partially cut away portion of an engine housing 31 of the engine equipped with plug-in pumps 11. In order to better illustrate the pump mounting, two plug-in pumps 11 are inserted into associated pump fittings 32 and fastened with the securing screws 17; one-and-a-half pump fittings 32 are shown without inserted plug-in pumps 11 and substantially comprise a mounting flange 33 and a reception bore 34 as well as a recess 35 cast integrally with the motor housing, the shape of the recess 35 enabling the coupling in of the coupling element 13, embodied as a ball-type head, of the plug-in pump 11 into a lateral slit 36 of a governor rod 37 belonging to the engine with the slit 36 serving as a mating element.

The governor rod 37 is guided in at least two bearings, not shown, in the engine housing 31 and is fabricated of flat steel and provided with the slits 36 spaced apart by the cylinder spacing A. The governor rod 37 is secured against deflection in a simple manner by means of guide pins 38 and is provided with a recess 39 for the engagement of a governor rod locking device 41 embodied as an inserted pin; by means of this locking device 41, the governor rod 37 can be fixed in the basic test position shown in FIG. 3. The insertion pin 41, inserted into a guide bore 42, is shown in FIG. 3 engaging only the recess 39 of the governor rod 37 from the side, this being for the sake of simplicity; however, a more favorable disposition which precludes incorrect manipulation results if the insertion pin 41 engages a correspondingly displaced recess 39 of the governor rod 37 from above, in the vicinity of the mounting flange 33, because in that case the insertion pin 41 has to be removed before the final plug-in pump 11 is mounted and thus cannot mistakenly remain located in the associated guide bore 42. Should the insertion pin 41 remain within this guide bore 42, it would cause an unintentional locking of the governor rod 37. For the sake of enabling an accommodation of the governor rod in a cost-favorable manner and fabricating it inexpensively and for the sake of easily controlled tolerances, the governor rod 37 is also provided with a supplementary disengaging element 43, which is engaged by a limiting stop means 44 for adjusting the full-load position of the governor rod 37. The limiting stop means 44 comprises a stay bolt 47 held in the illustrated position eccentrically within a threaded housing 35 by the force of a spring 46, and the stay bolt 47 can be drawn out of the illustrated position into a position permitting an increased starting quantity. The lateral distance between the stay bolt 47 and the lateral limitation of the disengaging element 43 is marked by the symbol $\Delta RW$, and it fixes the spacing between the full-load position of the governor rod 37 of the engine which is associated with the set-point supply quantity and the basic test position which can be relocated by means of the locking device 41 and which is the same for all pumps. The value for $\Delta RW$ is the same for all pumps in the testing sheet for the associated plug-in pump 11 and depends on the engine output.

A slash mark 48 of an adjusting device 49 is disposed in each mounting flange 33 of the pump fittings 32, serving as a second adjusting accessory which when the plug-in pump 11 is correctly inserted meets precisely with the slash marks 19 on the securing flange 15 of the plug-in pumps 11 serving as the first adjusting accessory. The associated method for attaching this adjusting device is described further below.

Figure 4:
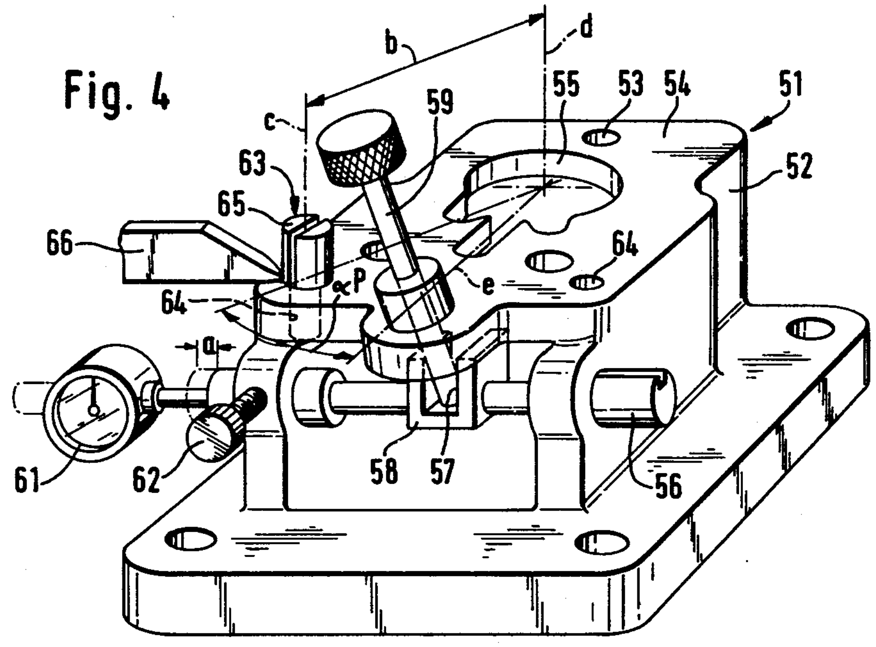
FIG. 4 shows a test pedestal, usable on the test bench, seen in a perspective view.

The test pedestal 51 shown in an oblique view in FIG. 4 serves the purpose of mounting and basic setting of the associated plug-in pump 11 on the test bench. A housing 52 of the test pedestal 51 has a reception bore 55, in the vicinity of a mounting flange 54 provided with securing bores 53, the reception bore 55 being intended for the plug-in pump 11 shown in FIGS. 1 and 2. An adjusting rod 56 corresponding to the engine governor rod 37 is guided at a fixed distance from and at right angles to the reception bore 55 in the housing 52 and approximately at its center it has a mating element 58, provided with a slit guideway 57 for the reception of the coupling element 13 of the plug-in pump 11, and also has a locking device 59 embodied by an insertion pin. The insertion pin 59 is introduced into the slit guide 57, in the illustrated basic test position of the adjusting rod 56, and by means of a measuring mechanism 61 indicated by dot-dash lines, which is set to zero in the basic test position, the adjusting rod 56 can be moved, when the insertion pin 59 has been removed, by a dimension a into a test position corresponding for example to the full-load position; this is indicated in FIG. 4 by dot-dash lines. The test position thus assumed can be maintained by means of a locking screw 62.

Also attached to the mounting flange 52 is a device for producing the first slash mark 19 on the securing flange 15 of the plug-in pump 11; this device is embodied by a scoring device 63 and substantially comprises a scoring tool guide 65 secured in a holder bore 64 disposed parallel to the reception bore 55. A scoring tool 66 which is part of the scoring device 63 is introduced into the guide 65 and used to produce the slash mark 19. A second holder bore 64 permits the use of a second device 63, should some other position for the slash mark 19 be more favorable. The longitudinal axis c of the holder bore 64 is disposed at a predetermined distance b from the central axis d of the reception bore 55 and at a fixed angular distance $\alpha_P$ of close tolerances from a central axis e of the mating element 58 of the adjusting rod 56 held firmly in the basic test position. These dimensions are fixed for each pump type and size, regardless of the specialized adjustment of such pumps, and are then the same for all types of apparatus.

However, instead of the device 63 an impact knife edge device (not shown) can also be secured on the test pedestal 51, being guided in a holder bore disposed at right angles to the reception bore 55. In that case, the longitudinal axis of the holder bore must point precisely at the fixed angular distance $\alpha_P$ relative to the central axis e as in FIG. 4.

Figure 5:
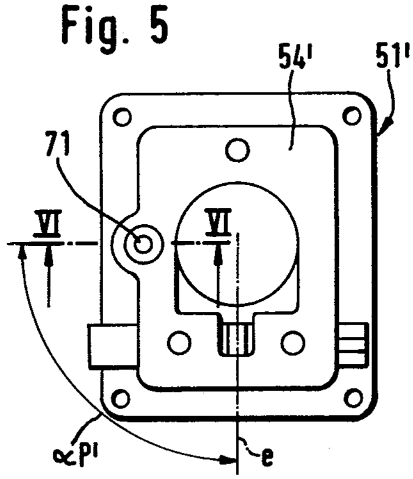
FIG. 5 is a plan view on a second exemplary embodiment of the test pedestal shown in FIG. 4.
Figure 6:
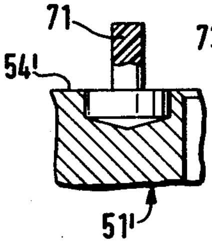
FIG. 6 is a partial section taken along the line VI—VI of FIG. 5.
Figure 7:
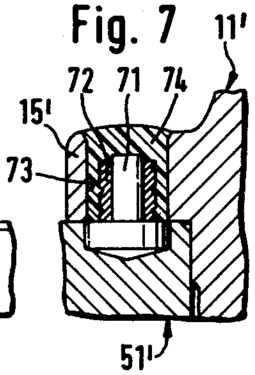
FIG. 7 is a partial section corresponding to FIG. 6, but additionally showing an inserted plug-in pump for illustrating the method for applying the fixation sheath, serving as the first fixation accessory, in the securing flange of the plug-in pump.

FIG. 5 is a plan view and FIG. 6 a partial view of a test pedestal 51′, shown in simplified form, for one variant of a method for accommodating the adjusting device. A holder pin 71, preferably fabricated of Teflon, is inserted and secured in the mounting flange 54′ of this test pedestal 51′ at an angular distance $\alpha_P$ from the central axis e (see FIG. 6 as well). By means of this holder pin 71, it is then possible as shown in FIG. 7, to pour a fixation sheath or casing of a fusion adhesive 78 into a reception bore 73 of correspondingly larger diameter which is provided in the flange 15′ of the plug-in pump 11′ over holding pin 71. Since the pin 71 is fabricated of Teflon, the plug-in pump 11′ can readily be pulled from the test pedestal 51′ together with the fixation sheath 72 produced in the manner explained.

Figure 8:
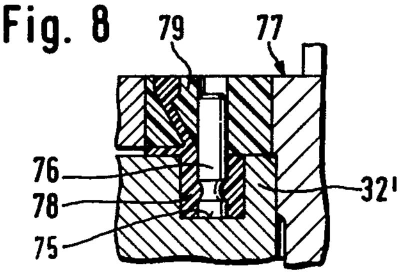
FIG. 8 shows the application of a fixation pin to the pump fitting of the engine by means of an appropriately embodied dummy pump.

In FIG. 8, a fixation pin 76 is shown which is secured in a blind bore 75 and serves as the second adjusting accessory. For example, said fixation pin is secured in an enlarged bore in a pump fitting 32′ of the combustion engine for the support of a dummy pump 77 by means of a fusion adhesive 78. For the associated method, the dummy pump 77 has a Teflon insert 79 guiding the pin 76 and preventing the melting adhesive 78 from adhering to the dummy pump 77. The fixation pin 76 is secured in an immovable manner in the blind bore 75 on the pump fitting 32′ with the diameter of the bore being greater than that of the fixation pin 76.

Figure 9:
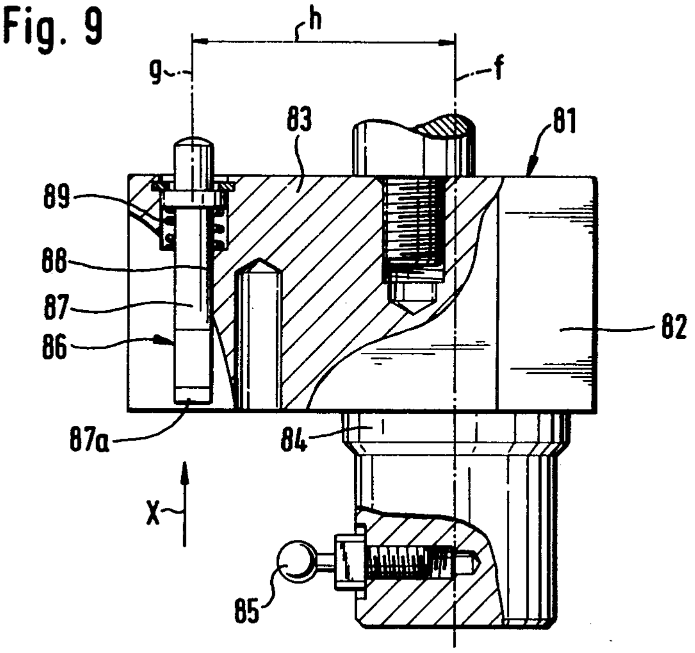
FIG. 9 is a partially cut away side view of a dummy pump.
Figure 10:
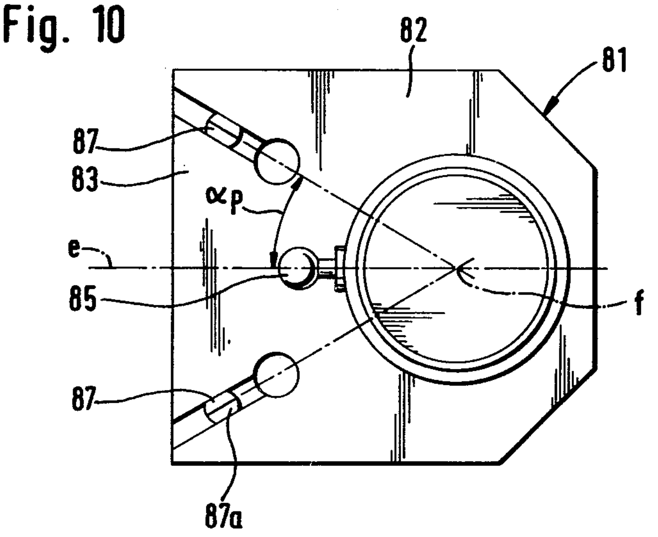
FIG. 10 is a view in the direction of the arrow X in FIG. 9.

A dummy pump 81 shown in FIGS. 9 and 10 substantially comprises a dummy body 82, corresponding to at least one portion of the pump housing 14 of the plug-in pump 11, and having a contact flange 83, a fitting element 84 for the introduction of the dummy pump 81 into the pump fitting 32 of the engine, and a stationary coupling element 85, which corresponds in its position to the coupling element 13 of the plug-in pump 11 when it is located in the basic test position and fits into the mating element 36 of the engine governor rod 37. An impact knife-edge device 86 provided as the device for producing the second adjusting accessory 48 on the pump fitting 32 is attached to the contact flange 83. On its end, the impact knife-edge device 86 has an impact bolt 87 provided with a cutting edge 87*a*, the bolt 87 being received by a guide bore 88 disposed parallel to a longitudinal axis f of the fitting element 84. A longitudinal axis g of the guide bore 88 is machined into the contact flange 83 at a predetermined distance h from the longitudinal axis f of the fitting element 84 and at a fixed, narrow-tolerance angular distance $\alpha_P$ already described in connection with FIG. 4, from the central axis e of the stationary coupling element 85. A restoring spring 89 keeps the impact bolt 87 in the illustrated upwardly projected position.

DESCRIPTION OF THE METHOD

The method according to the invention for mounting the devices shown in FIGS. 4–10 has the following method steps:

(a) the plug-in pump 11 is inserted into the reception bore 55 of the test pedestal 51 (see FIG. 4), this bore corresponding to the pump fitting 32 (see FIG. 3), and the coupling element 13 of the plug-in pump 11 is thereby introduced into the slit guide 57 of the mating element 58 of the adjusting rod 56; the adjusting rod 56 is appropriately held in the illustrated basic test position by the insertion pin 59, while the securing screws 17 of the plug-in pump 11 are tightened temporarily with slight torque, and by means of the measuring mechanism 61 the adjusting rod 56 is shifted out of the illustrated basic test position, the insertion pin 59 being removed, by the spacing dimension a into the test position (this test position is advantageously the full-load position of the injection pump);

(b) given a test bench driven at a fixed test rpm, the supply quantity of the plug-in pump 11 is measured and the pump is rotated until such time as the supply quantity corresponds to a set-point supply quantity, and (c) the established rotary position, associated with the set-point supply quantity, of the plug-in pump 11 is marked on the pump in that by means of the scoring tool 66 and with the aid of the device 63, the slash mark 19 is placed upon the machined face 18 of the securing flange 15 of the pump 11;

(d) prior to mounting of the plug-in pump 11 onto the engine, the engine governor rod 37 (see FIG. 3) is placed in the basic test position and is held firmly in this position by the locking device;

(e) the dummy pump 81 (see FIGS. 9 and 10) is inserted into the pump fitting 32 of the engine and the positionally fixed coupling element is thereby introduced into the slit 36, acting as the mating element, of the governor rod 37; subsequently the slash mark 48, acting as the second adjusting accessory, is cut into the pump fitting 32 by a stroke upon the impact bolt 87 of the impact knife-edge device 36, and the dummy pump 81 is then again removed;

(f) the plug-in pump 11, after its pre-stroke has been adjusted in a known manner, is inserted into the pump fitting 32 and the supply quantity adjusting member is thereby coupled with the governor rod 37;

(g) the plug-in pump 11 is rotated into a mounting position in which the slash mark 19 on the securing flange 15 is in alignment with the second slash mark 48 on the pump fitting 32; in this mounting position, the plug-in pump 11 is secured to the engine by means of the securing screws 17;

(h) the limiting stop 44 for the governor rod 37 is adjusted to a full-load position corresponding to or associated with the test position; and (i) the locking of the engine governor rod 37 effected in method step d is released once again.

By means of the locking of the governor rod 37 effected in method step d, it is possible to mount a measuring mechanism on the governor rod when the governor rod is accessible from the outside, and the measuring mechanism can then be set to zero in the locked test position. The governor rod 37 is subsequently displaced by the dimensional difference ΔRW, which may correspond to the distance dimension a, after the loosening of the lock and the limiting stop 44 can then be engaged. If the governor rod 37 is not accessible from the outside, then the full-load position must be adjusted, at the latest when one pump fitting 32 still remains without a plug-in pump 11. In that case, an especially fabricated measuring mechanism can be introduced into the reception bore 34 and with its scanning pin it may engage the slit 36 of the governor rod 37. In the case of the governor rod 37 locked by the insertion pin 41, the measuring mechanism is then again set to zero and moved, with the insertion pin 41 having been removed, by the dimension of ΔRW, in that the threaded housing 45 of the limiting stop 44 is rotated, the stay bolt 47 being in contact with the recess 43, until such time as the measuring mechanism indicates the dimensional difference RW which has been fixed for the test position. This position of the limiting stop 44 is thus attained and assuring the test position then fixes the full-load position for all the plug-in pumps 11 of one engine.

Since the two slash marks 19 and 48 meet at right angles in the illustrated exemplary embodiment, they can be brought into a position where they meet optically in a fully satisfactory manner and practically without perceptible tolerances.

Instead of the two slash marks 19 and 48, the adjusting device may also comprise a known fixation pin apparatus, in which case in method step c, by means of a drilling device (not shown) disposed on the test pedestal 51, a first reception bore serving as the first adjusting accessory is drilled into the securing flange 15 of the plug-in pump 11 to receive a fixation pin. In method step e, then a second reception bore must be drilled into the pump fitting 32 for the fixation pin, by means of a drilling device attached to the dummy pump 81 instead of the impact knife-edge device 86. Then in method step g, both bores are made to meet, and the fixation pin is inserted.

One of these method variants again does not require any slash marks and is performed using the devices shown in FIGS. 5–8. This method differs from the first method only in that in method step c, by means of the holder pin 71 located on the test pedestal 51' (see FIG. 5), a fixation sheath inserted via this holder pin 71 and serving as the first fixation accessory is secured or poured into the enlarged reception bore 73 of the securing flange 15' of the plug-in pump 11' (see FIG. 7) by means of the melting adhesive 74. In method step e, the fixation pin 76 acting as the second adjusting accessory is then secured by means of the dummy pump 77 (see FIG. 8) to the pump fitting 32' of the engine, this being accomplished in that the fixation pump 76 is held by the dummy pump 77 and is secured in the blind bore 75 on the pump fitting 32' by means of a thermoplastic melting adhesive 78, or in other words poured by an injection molding process.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A method for adjusting a plug-in fuel injection pump having a body portion provided with a supply quantity adjusting member located in a predetermined test position, comprising the steps of:

(a) inserting said injection pump into a bore in a test bench, corresponding to a pump fitting into which said injection pump is to be placed;

(b) introducing a coupling element associated with said supply quantity adjusting member into means cooperative with an adjusting rod in said test bench, said adjusting rod being arranged to correspond to an engine governor rod in an engine in which said injection pump is to be placed;

(c) simultaneously shifting said adjusting rod and said coupling element into a test position corresponding to full load of the injection pump;

(d) driving said fuel injection pump at a fixed test rpm to measure a fuel supply quantity;

(e) rotating said injection pump relative to said bore in said test bench until said fuel supply quantity corresponds to a set point quantity;

(f) producing a first reference indication of an adjusted rotary position of the injection pump on the body portion of the pump relative to said test bench;

(g) locking the engine governor rod of an engine in which said injection pump is to be placed into a basic test position;

(h) inserting a dummy pump having a positionally fixed coupling member corresonding to the coupling element of said injection pump into a pump fitting of the engine in which said injection pump is to be placed so as to engage a mating element of the engine goveror rod;

(i) applying a second positional alignment reference indication on the pump fitting and thereafter removing the dummy pump from the pump fitting;

(j) setting the pre-stroke of the injection pump in a known manner;

(k) removing said injection pump from the test pedestal and inserting said injection pump into the pump fitting of the engine so that said supply quantity adjusting member engages the mating element of said governor rod;

(l) rotating the injection pump in the pump fitting so that said first and second positional adjustment markings are aligned;

(m) securing said injection pump to the pump fitting;

(n) adjusting a limiting stop for the engine governor rod to a full load position corresponding substantially to its test position; and (o) unlocking the engine governor rod.

2. A method as defined by claim 1, characterized in that said first reference indication is a slash mark applied to the body portion of said plug-in pump and said second positional alignment reference indication is a slash mark applied to the pump fitting and that said first and second slash marks are caused to meet optically by rotation of said injection pump in the pump fitting of an engine in which said injection pump is placed.

3. A method as defined by claim 1, characterized in that said second positional alignment reference indication is a fixation pin placed by means of said dummy pump on the pump fitting of the engine.

4. A method as defined by claim 3, characterized in that said fixation pin is held by said dummy pump and includes the step of securing said fixation pin in a blind bore on said pump fitting by means of a thermoplastic melting adhesive, the blind bore having a diameter which is larger with respect to the diameter of the fixation pin.

5. A method as defined by claim 3 characterized in that said first reference indication is formed by making a bore in a securing flange of said injection pump, positioning said bore over a pin in said test bench, pouring a settling material into said bore to form a fixation sheath having a diameter less than the diameter of said flange in said bore.

6. A method as defined by claim 4 characterized in that said first reference indication is formed by making a bore in a securing flange of said injection pump, positioning said bore over a pin in said test bench, pouring a setting material into said bore to form a fixation sheath having a diameter less than the diameter of said flange in said bore.

7. A method as defined by claim 1, characterized in that said first reference indication is formed by drilling a first reception bore for a fixation pin into the securing flange of the plug-in pump, and that said second reference indication is formed by drilling a second reception bore for the fixation pin into the pump fitting; and that the two bores are caused to meet and the fixation pin is inserted to align said injection pump with said pump fitting.

8. A method as defined by claim 1, 2, 3, 4, 5, 6 or 7, characterized in that the full-load position of the engine governor rod has a fixed distance ($\Delta$RW) from the basic test position relocatable by a locking device, and that this distance is equal to the predetermined distance dimension (a) between the basic test position and the full-load position fixed as the test position, of the supply quantity adjusting member of the plug-in pump.

9. A test pedestal which comprises a housing, a reception bore in said housing for receiving a plug-in pump, an adjusting rod corresponding to an engine governor rod, a locking device for positionally fixing said adjusting rod in a basic test position and a device for forming a reference indication on a plug-in pump being tested.

10. A test pedestal as defined by claim 9, characterized in that said device for forming a reference indicator on the plug-in pump comprises a scoring device which includes a scoring tool guide secured in a holder bore disposed parallel to said reception bore.

11. A test pedestal as defined by claim 9 wherein said device for forming a reference indicator is an impact knife-edge device which is guided in a holder bore disposed at right angles to the reception bore and is secured on the housing of the test pedestal.

12. A test pedestal as claimed in claim 10 or 11, characterized in that the holder bore has a longitudinal axis c which is disposed with a fixed, narrow-tolerance angular distance ($\alpha_P$) with respect to the center d of the reception bore, relative to the center axis e of a mating element of the adjusting rod fixed in a basic test position.

13. A dummy pump which comprises a dummy body corresponding to at least one part of a pump housing, the dummy body being provided with a contact flange, a fitting part for introduction into a pump fitting of an engine, a positionally fixed coupling element for an engine governor rod and a device for placing a second adjusting accessory on a pump fitting.

14. A dummy pump as defined by claim 13, which includes an impact knife-edge device, said impact knife device having an impact bolt provided at its end with a cutting edge, said impact bolt being received by a guide bore disposed parallel to the longitudinal axis f of the fitting element, the longitudinal axis g of the guide bore being spaced apart by a predetermined distance h from the longitudinal axis f of the fitting element and by a fixed, narrow-tolerance angular distance ($\alpha_P$) from the central axis e of the positionally fixed coupling element.

* * * * *